US012208770B2

(12) United States Patent
Yates

(10) Patent No.: US 12,208,770 B2
(45) Date of Patent: Jan. 28, 2025

(54) VEHICLE EQUIPPED WITH SAFETY SYSTEM AND METHOD OF RESPONDING TO AN UNAUTHORIZED POSSESSION OF A VEHICLE

(71) Applicant: William D. Yates, Chicago, IL (US)

(72) Inventor: William D. Yates, Chicago, IL (US)

( * ) Notice: Subject to any disclaimer, the term of this patent is extended or adjusted under 35 U.S.C. 154(b) by 0 days.

(21) Appl. No.: 17/712,410

(22) Filed: Apr. 4, 2022

(65) Prior Publication Data

US 2022/0314931 A1 Oct. 6, 2022

Related U.S. Application Data

(60) Provisional application No. 63/170,928, filed on Apr. 5, 2021, provisional application No. 63/171,143, filed on Apr. 6, 2021.

(51) Int. Cl.
*B60R 25/30* (2013.01)
*B60R 25/31* (2013.01)
*B60R 25/102* (2013.01)
*B60R 25/104* (2013.01)

(52) U.S. Cl.
CPC .......... *B60R 25/30* (2013.01); *B60R 25/305* (2013.01); *B60R 25/31* (2013.01); *B60R 25/102* (2013.01); *B60R 25/104* (2013.01)

(58) Field of Classification Search
CPC ..... G08B 5/00; G06F 3/00; G06F 3/01; G06F 3/013; G06F 3/14; G06T 19/00; B60K 35/00; B60Q 1/00; B60W 50/00; B60W 50/14
See application file for complete search history.

(56) References Cited

U.S. PATENT DOCUMENTS

| | | |
|---|---|---|
| 3,820,066 A | 6/1974 | Kennell |
| 4,866,417 A | 9/1989 | DeFino |
| 5,307,048 A | 4/1994 | Sonders |
| 5,315,286 A | 5/1994 | Nolan |
| 5,319,351 A | 6/1994 | Beezley, Jr. |
| 5,335,748 A | 8/1994 | Wilson |
| 5,382,948 A | 1/1995 | Richmond |
| 5,394,135 A | 2/1995 | Stadler |

(Continued)

OTHER PUBLICATIONS

NPL Search (Mar. 17, 2023).*

*Primary Examiner* — Van T Trieu
(74) *Attorney, Agent, or Firm* — Vitale, Vickrey, Niro, Solon & Gasey LLP

(57) ABSTRACT

A method of, and safety system usable in, responding to an unauthorized possession of a vehicle configured to transport at least one person, including the steps of: obtaining the vehicle with the safety system associated therewith, the safety system configured to at least one of: a) generate at least one form of detectable signal; b) generate an electronic signal; and c) generate at least one image of a person in/on the vehicle; and generating an input to cause the system to generate at least one of: i) the at least one form of detectable signal that can be sensed by persons in the vicinity of the vehicle; ii) the electronic signal; and iii) the at least one image of a person in/on the vehicle. The system is configured so that at least one of the at least one form of detectable signal, the electronic signal, and the at least one image is generated after a time delay following the generation of the input to the safety system.

19 Claims, 4 Drawing Sheets

(56) References Cited

U.S. PATENT DOCUMENTS

| | | |
|---|---|---|
| 5,412,370 A | 5/1995 | Berman |
| 5,438,311 A | 8/1995 | Lane, Sr. |
| 5,453,730 A | 9/1995 | De-Grinis |
| 5,469,134 A | 11/1995 | Garrett |
| 5,477,206 A | 12/1995 | Rodriguez, Sr. |
| 5,493,268 A | 2/1996 | Lewis, Sr. |
| 5,494,130 A | 2/1996 | Foster |
| 5,515,285 A | 5/1996 | Garrett, Sr. |
| 5,519,255 A | 5/1996 | Burtch |
| 5,559,491 A | 9/1996 | Stadler |
| 5,563,577 A | 10/1996 | Adkins |
| 5,574,425 A | 11/1996 | Shu |
| 5,608,272 A | 3/1997 | Tanguay |
| 5,623,245 A | 4/1997 | Gilmore |
| 5,635,901 A | 6/1997 | Weinblatt |
| 5,635,912 A | 6/1997 | McCracken |
| 5,652,564 A | 7/1997 | Winbush |
| 5,742,227 A | 4/1998 | Escareno |
| 5,745,030 A | 4/1998 | Aaron |
| 5,912,615 A | 6/1999 | Kretzmar |
| 5,973,592 A | 10/1999 | Flick |
| 5,990,786 A | 11/1999 | Issa |
| 6,002,326 A | 12/1999 | Turner |
| 6,124,783 A | 9/2000 | Alexander |
| 6,229,436 B1 | 5/2001 | Ramsey |
| 6,392,559 B1 | 5/2002 | Sharpe, Jr. |
| 6,404,327 B1 | 6/2002 | Naddeo |
| 6,542,076 B1 | 4/2003 | Joao |
| 6,587,046 B2 | 7/2003 | Joao |
| 6,803,882 B2 | 10/2004 | Hoetzel |
| 7,245,204 B2 | 7/2007 | Ramos |
| 7,277,010 B2 | 10/2007 | Joao |
| 7,319,378 B1 | 1/2008 | Thompson |
| 7,339,459 B2 | 3/2008 | Jordan |
| 7,397,363 B2 | 7/2008 | Joao |
| 7,518,489 B2 | 4/2009 | Nelson |
| 7,551,065 B2 | 6/2009 | Higuchi |
| 7,641,369 B1 | 1/2010 | Deveau |
| 7,642,900 B2 | 1/2010 | Natsume |
| 8,089,347 B2 | 1/2012 | Aguirre |
| 8,436,721 B1 | 5/2013 | Lee |
| 8,749,345 B2 | 6/2014 | Thompson |
| 8,779,912 B2 | 7/2014 | Sverrisson |
| 8,842,006 B2 | 9/2014 | Anderson |
| 9,688,246 B2 | 6/2017 | Kleve |
| 9,940,839 B2 | 4/2018 | Stafford |
| 10,017,156 B2 | 7/2018 | Etonye |
| 10,152,876 B2 | 12/2018 | Joao |
| 10,259,427 B1 | 4/2019 | Kearney |
| 10,389,711 B2 | 8/2019 | Abreu |
| 10,800,377 B1 | 10/2020 | Weber, Jr. |
| 11,170,751 B1 * | 11/2021 | Lee .................... G10K 11/1783 |
| 2002/0175565 A1 | 11/2002 | Suber |
| 2004/0135680 A1 | 7/2004 | Jacobs |
| 2004/0204806 A1 | 10/2004 | Chen |
| 2008/0136660 A1 | 6/2008 | Bailey |
| 2008/0204556 A1 | 8/2008 | de Miranda |
| 2008/0234878 A1 | 9/2008 | Joao |
| 2013/0033369 A1 | 2/2013 | Burnett |
| 2018/0136655 A1 * | 5/2018 | Kim .................... G05D 1/0088 |
| 2018/0253609 A1 * | 9/2018 | Potter ...................... B60Q 1/08 |
| 2019/0318609 A1 | 10/2019 | Obayuwana |
| 2019/0327415 A1 * | 10/2019 | Prabhakar ............. H04N 23/63 |
| 2020/0238952 A1 * | 7/2020 | Lindsay ............... G06V 30/194 |

* cited by examiner

VEHICLE EQUIPPED WITH SAFETY SYSTEM AND METHOD OF RESPONDING TO AN UNAUTHORIZED POSSESSION OF A VEHICLE

This application claims priority to Provisional Patent Application No. 63/170,928, filed on Apr. 5, 2021 and Provisional Patent Application No. 63/171,143, filed on Apr. 6, 2021.

BACKGROUND OF THE INVENTION

Field of the Invention

This invention relates to self-propelled vehicles and, more particularly, to a method of responding to an unauthorized possession of a vehicle. The invention is further directed to a vehicle equipped with a safety system through which the method can be practiced. Additionally, this invention relates to anti-carjacking apparatus, systems, and methods for the avoidance of hi-speed pursuits and the preservation of occupant safety.

Background Art

As the number of self-propelled vehicles, such as cars, trucks, motorcycles, etc. continues to increase worldwide, so does the incidence of theft associated with such vehicles.

Vehicle theft has been a persistent problem that has challenged law enforcement agencies for decades. As the number, and value, of such vehicles continue to increase, they become more enticing to individual thieves and an industry that coordinates theft rings worldwide.

Theft of unoccupied vehicles causes damages that are primarily economic in nature. Sophisticated thieves can appropriate vehicles without being observed or recognized by vehicle owners or law enforcement personnel. Vehicles may be relocated or stripped whereby they may not be later identified or recovered.

The extent of theft has led car manufacturers, and businesses offering security systems, to devise security systems that will challenge even the most sophisticated of thieves. Modern vehicles utilize computer-driven technology that makes "hotwiring" difficult or impossible, and starting of most vehicles without access to a vehicle's fob effectively impossible. The success of these systems has prevented much theft but has led to an expansion of the crime of vehicle hijacking.

Vehicle hijackers are able to exploit the fact that the vehicle they are overtaking is already in an operating state, obviating the need to hardwire or otherwise start the vehicle engine. Vehicle hijacking introduces danger that may not be present with a simple theft.

One of the most dangerous situations is one wherein the vehicle being hijacked has multiple occupants. Many carjackings take place with young passengers involved, including toddlers properly restrained within the vehicle.

Unfortunately, many vehicle owners instinctively take dangerous actions to protect their family and friends and the substantial investment they may have in a vehicle. Carjackers typically react to this emotional response by quickly and violently completing the act of overtaking the vehicle owner and escaping with the vehicle. This has led to a large number of carjackings wherein the occupants remain with the hijacked vehicle and face an uncertain outcome depending upon the state of mind of the carjacker.

Generally, a carjackers success hinges upon being able to ultimately leave the carjacking scene and pull into an area to be undetected or blend into other traffic such that identification may be delayed long enough that the carjacker will not be caught.

Common sense dictates that particularly when only a driver is involved, the vehicle should be surrendered with little resistance. However, many people impulsively act to protect their investment, operating the vehicle at all times with the preconceived notion that they may not see their stolen vehicle again and they may not be made whole by insurance.

The problem is aggravated when other occupants of the vehicle, and particularly young occupants, have their safety compromised by the carjacking situation. Vehicle owners could be more composed in a carjacking situation if they were confident that the carjacker could be properly identified and arrested after the event takes place. Currently, the only peace of mind offered the vehicle owner is that once the carjacking is phoned into the law enforcement community, extreme steps generally will be taken to recover the stolen vehicle in a short period of time.

Aside from the danger faced by the vehicle owner and the vehicle occupants, carjacking situations place in danger the law enforcement community and the general public. Carjackers often recklessly leave a carjacking scene driving at high speeds. This puts pedestrians in danger and puts at risk other vehicles on the highways in the vicinity of the hijacking. Still further, law enforcement will commonly engage a carjacker in a high speed chase, which may have dangerous consequences.

Many governmental agencies are attempting to prevent vehicle hijackings by increasing the numbers of law enforcement personnel tasked with being present to intervene in a hijack situation before the hijacker(s) can escape. As a practical matter, the vast geographical expanse in monitored areas and large number of vehicles make this proposed solution of limited value. The penalties facing a prosecuted hijacker currently are not severe in most jurisdictions, which has led to a rash of hijacking by young persons, including persons too young to even obtain a driver's license.

As RFID key evolution matures, wide scale adoption will progress in a manner similar to that of anti-lock braking, air bags, and other systems that have become standard features in the modern motor vehicles of today. It is anticipated that RFID technology will also become widely accepted over the next several years thus becoming a standard feature in motor vehicles of the future. The inventor hereof, however, believes that since car thieves will then no longer be able to hot wire newer vehicles from a parked condition in the absence of the driver, there will therefore be more incidents of carjacking with vehicle owners or drivers taken hostage. Thus the present invention proposes various embodiments of anti-carjacking apparatus, systems, and methods for the avoidance of hi-speed pursuits which also provide for the preservation of occupant safety.

The manufacturers of motor vehicles and security systems have been presented the challenge of reducing the incidents of vehicle hijacking. To date, those proposed solutions have failed to adequately address the problem or even reduce the incidence of vehicle hijacking.

SUMMARY OF THE INVENTION

In one form, the invention is directed to a method of responding to an unauthorized possession of a vehicle configured to transport at least one person. The method includes the steps of: obtaining the vehicle with an associated safety system, the safety system configured to at least one of: a) generate at least one form of detectable signal; b) generate an electronic signal transmittable to a device; and c) generate at least one image of a person in/on the vehicle; and generating an input to cause the system to generate at least one of: i) the at least one form of detectable signal that can be sensed by persons in the vicinity of the vehicle; ii) the electronic signal; and iii) the at least one image of a person in/on the vehicle. The system is configured so that at least one of the at least one form of detectable signal, the electronic signal, and the at least one image is generated after a time delay following the generation of the input to the safety system.

In one form, the at least one form of detectable signal is aurally detectable.

In one form, the at least one form of detectable signal is visually detectable.

In one form, the safety system is configured so that the aurally detectable signal is generated from spaced locations.

In one form, the safety system is configured so that the visually detectable signal is generated from spaced locations.

In one form, the step of generating an input involves generating an input through an actuator on the vehicle.

In one form, the step of generating a signal involves generating an input through a wireless transmitter.

In one form, the at least one image is generated upon the input being generated.

In one form, the at least one image is generated after the time delay following the generation of the input to the safety system.

In one form, the generation of the at least one image involves a generation of streamed images.

In one form, the method further includes the step of causing the at least one image to be transmitted to a prescribed location.

In one form, the vehicle has a passenger compartment. The aurally detectable signal is generated from within the passenger compartment.

In one form, the spaced locations are a first location adjacent to a front of the vehicle and a second location adjacent to a rear of the vehicle.

In one form, the spaced locations are at least three locations.

In one form, the spaced locations are a first location adjacent to a front of the vehicle, a second location adjacent a rear of the vehicle, and third and fourth locations, one each adjacent spaces sides of the vehicle.

In one form, the vehicle has an undercarriage. The spaced locations are on the undercarriage.

In one form, the aurally detectable signal is generated at a level of at least 50 decibels.

In one form, the visually detectable signal is generated at a level of at least 4000 lumens.

In one form, the visually detectable signal is a strobing light.

In one form, the time delay is at least 15 seconds.

DETAILED DESCRIPTION OF THE PREFERRED EMBODIMENT

Figure 1:
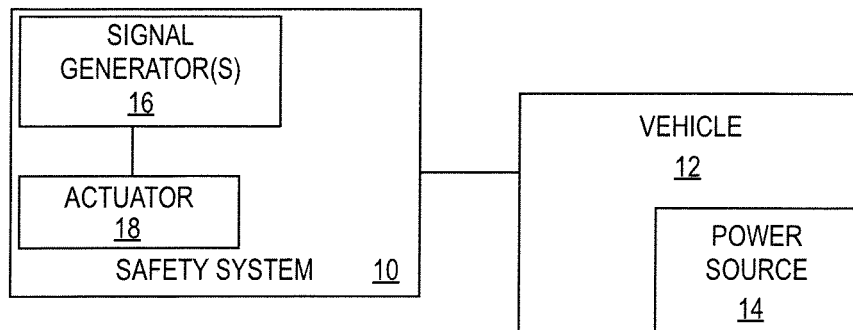
FIG. 1 is a schematic representation of a conventional vehicle with a safety system, according to the invention, associated therewith and including at least one signal generator.

The present invention is directed to a safety system, as shown schematically at 10 in FIG. 1, for use in association with a vehicle, shown also schematically in FIG. 1 at 12.

The vehicle 12 may be any type of vehicle that is used to transport at least one person. While the vehicle 12 could conceivably be propelled by a person, typically the vehicle 12 will have a power source 14 operable to make the vehicle 12 self-propelled. The power source 14 may be of any construction, such as one operated by a combustible fuel, one electrically powered, one solar powered, etc.

The safety system 10 consists of at least one signal generator 16 and an actuator 18 that is operable to generate an input to the signal generator 16 that results in a signal being generated thereby.

The signal generator 16 may produce one or more forms of signal—as that may be detectable by persons in the vicinity of, or in the line of sight of the vehicle 12, and/or transmitted electronically to a device on site or at a remote location.

Figure 2:
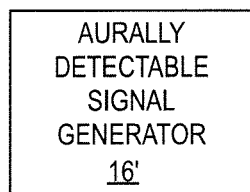
FIG. 2 is a schematic representation of one form of the signal generator as shown in FIG. 1 and capable of generating one form of detectable signal.

As shown schematically in FIG. 2, one form of the signal generator 16 is shown to be in the form of an aurally detectable signal generator 16'.

Figure 3:
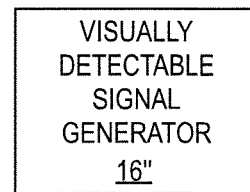
FIG. 3 is a view as in FIG. 2 wherein the generator produces another form of detectable signal.

In FIG. 3, in an alternative form, the signal generator 16 is shown as a visually detectable signal generator 16".

Figure 4:
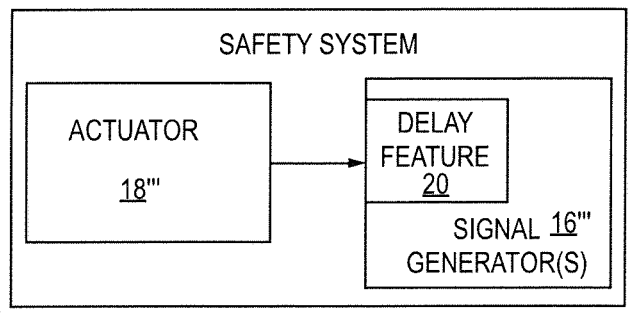
FIG. 4 is a schematic representation of a more specific form of the safety system as shown in FIG. 1 and including a delay feature for at least one signal generator thereon.

In one preferred form of the safety system 10''', as shown in FIG. 4, the signal generator 16''' is constructed so that the generated signals are readily detectable by persons within line of sight of the vehicle 12 or within close enough proximity to be heard, whereby the vehicle 12 can be tracked by monitoring the detected signals. In this one form of safety system 10''', the signal generator 16''' incorporates a delay feature 20 whereby there is a time interval between when an input at 22 is generated through the actuator 18''' and when the signals generated by the signal generator 16''' are detectable.

The delay feature 20 may be such that the time interval is a predetermined fixed time interval. Alternatively, the safety system 10''' may incorporate the ability to set a time interval through the delay feature 20 at different lengths.

It should be understood that, for reasons explained below, the delay feature 20 makes more desirable the use of a signal generator 16 that may be detected through human sensation rather than by reason of an electronic transmission. A signal generator construction is contemplated within the generic showing in FIG. 1 with the capability of generating a mix of signals, with some instantaneously generated and others delayed following an actuator input. Alternatively, instantaneous signal generation or delayed signal generation may be effected by all of the forms of signal generator in a system configuration.

The significance of the delay feature 20 is as follows. Consistent with what is described in the Background Art portion herein, there are two aspects of a carjacking situation that make the event particularly dangerous.

First of all, an instantaneous trigger of a conventional car alarm system on the vehicle 12 may cause the carjacker(s) to have an impulsive violent reaction. The carjacker(s) may then be prone to inflicting injury on the vehicle driver and/or passengers whereas they otherwise might remain composed with the feeling of being in control.

Further, given the success rate for particularly sophisticated carjackers, most vehicle owners are of the belief that once a carjacker assumes control of a vehicle, odds are in his/her favor to escape the crime scene without immediate, or even long term, consequences. Thus, drivers are often inclined to believe that once the carjacker(s) has left the scene of the crime, the vehicle and its contents may never be seen again or may be placed in a damaged or destroyed condition. More significantly, an impulse with particularly a young passenger being transported by a carjacker is that the passenger is more likely than not to be harmed once the carjacker(s) has become distanced from the crime scene without detection. Thus, this leads persons to often dangerously put their lives and the lives of the passengers at risk immediately upon detection of the carjacking effort.

One object of the invention, and particularly with the delay feature incorporated, is that it provides some level of tempering of a victim's reaction with the understanding that an immediate confrontation is not necessary to recover the vehicle and/or its contents, as might trigger a violent or deadly reaction on the part of the carjacker(s).

The present invention is designed so that a victim may have a reasonable sense of comfort knowing that once the delayed signal generator generates the one or more signal forms, the vehicle 12 will be a readily trackable "spectacle" in the presence of/proximity of observers. This is coupled with the potential ability to additionally generate a signal electronically to law enforcement. A thief, realizing that he/she cannot avoid immediate detection of ongoing tracking, is likely to abandon the vehicle.

Figure 5:
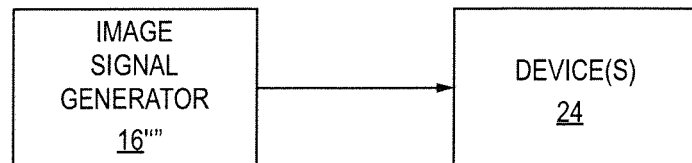
FIG. 5 is a schematic representation of another form of the signal generator as in FIG. 1 that produces images that are transmitted to a device.

This system advantage is further enhanced by another aspect of the safety system whereby the signal generator 16 may, alternatively or additionally, include an image signal generator 164' as depicted schematically in FIG. 5, through which signals can be transmitted to one or more devices 24 at which a visual image of the occupant(s) of the vehicle 12 can be generated either as a single image or in streaming form.

In summary, a person having the inventive safety system on his/her vehicle operates the vehicle at all times with the understanding that: a) the signal generated by the appropriate generator 16 may be delayed whereby the carjacker(s) will not immediately be startled into having a dangerous reaction; b) the vehicle 12 with the carjacker attempting an escape will, after the delay interval, be a "spectacle" such that the vehicle being carjacked will not be practically blended into normal traffic or escape to any location where it would not be readily detectable by persons on the street in a line of sight or within hearing distance; and c) the identity of the carjacker(s) will be promptly and reliably made.

The significance of a), above, is that in a more secure state of mind, a victim of a carjacker may be able to calmly defuse a situation to allow safe release of all passengers, thereby avoiding the impulse to take drastic measures to prevent loss of, or damage to, persons and/or property.

At the same time, the signal generator 16 may immediately generate an electronic signal, as to law enforcement personnel, allowing law enforcement to immediately become aware of the carjacking and potentially obtain information that facilitates immediate response and tracking.

Figure 6:
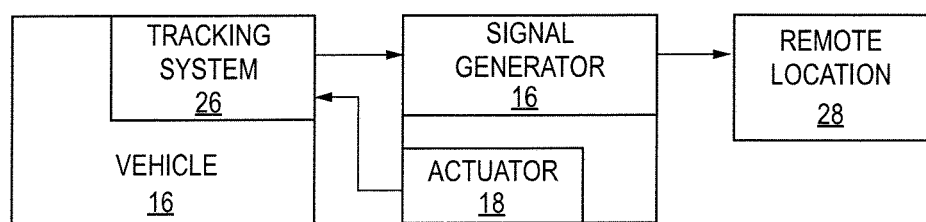
FIG. 6 is a schematic representation of the inventive safety system incorporated into a tracking system on a vehicle to coordinate signal generation to a remote location.

As shown in FIG. 6, the vehicle 12 may incorporate a tracking system 26, that may be considered part of either the vehicle 12 or the separate inventive safety system 10, that is coordinated with the signal generator 16. A user input to the actuator 18 may cause the tracking system to interact with the signal generator 16, which in turn transmits inputs/data to a remote location 28, as to a device thereat that allows appropriate action to be taken to pursue the vehicle 12 with the assistance of the capabilities of the tracking system 26. The remote location 28 may be a law enforcement facility or a monitoring location for an entity that provided the tracking system 26 to the vehicle owner, or the manufacturer of the vehicle 12 that incorporates such tracking systems 26 as original equipment or accessories.

The signal generator 16 may cause the signal generated at the remote location 28 to occur instantaneously without the delay feature 20 since this signal will not be detectable by the carjacker(s.)

A primary objective of the invention is to make the vehicle 12 a public spectacle once the signal generator 16 generates an appropriate signal. While conventional alarm systems are operable to flash the vehicle's own headlights and taillights, and to actuate the vehicle's horn, these systems are typically actuated with the vehicle in a static state upon the system being breached. Significantly, conventional "car alarms" are so commonly triggered that often bystanders do not even pay attention to the fact that a car horn is repetitively beeping and/or the normal operating lights in the vehicle are flashing.

Accordingly, the detectable signal generators 16', 16" are designed to be operational with the vehicle 12 moving and to produce detectable signals that are so pronounced that they are not likely to be ignored by bystanders and which facilitate easy tracking and following of the vehicle.

As shown in FIGS. 7-12, one exemplary form of vehicle 12 is a conventional four wheel passenger vehicle. The vehicle 12 has a front 30 and a rear 32.

In the embodiment depicted, a generator 16' for aurally detectable signals is provided adjacent each of the front 30 and rear 32 of the vehicle 12.

By reason of having the signal generators 16' at multiple locations as shown, persons in front of the vehicle 12 and following the vehicle 12 may clearly hear the generated sound.

Suitable signal generators 16' may be provided at other locations for primarily external sound transmission.

Further, at least one signal generator 16' may be provided within the vehicle passenger compartment 34. Within the closed space of the passenger compartment 34, the signal generated may be ear-piercing, which may induce the carjacker(s) to abandon the vehicle 12.

Figure 7:
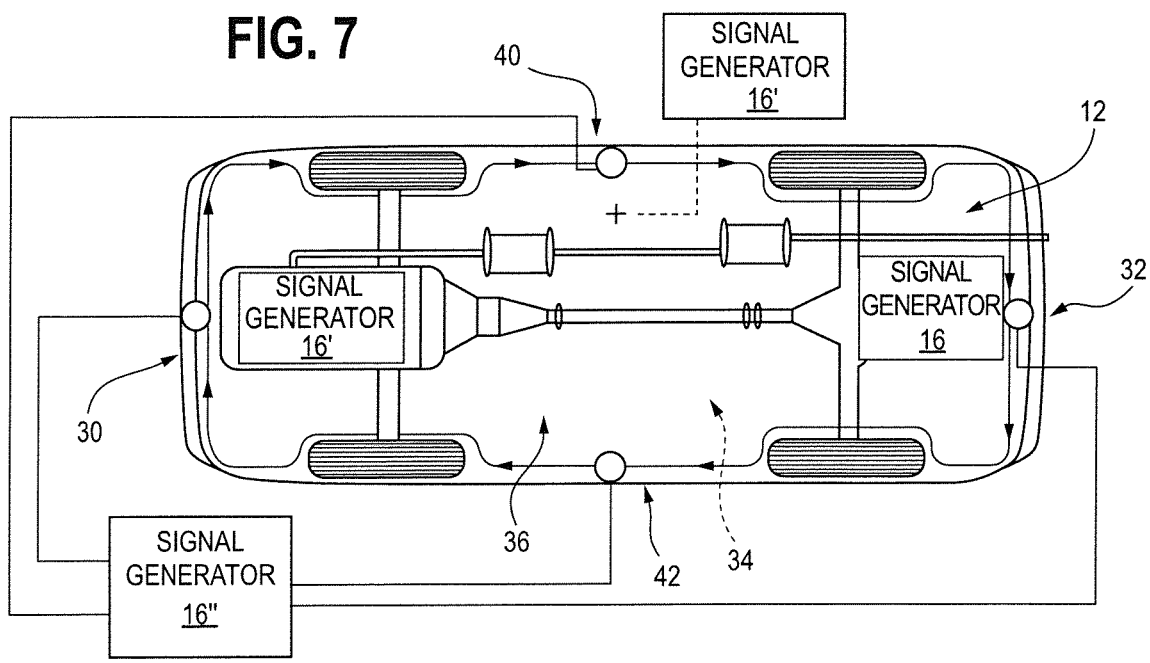
FIG. 7 is a bottom view of an exemplary vehicle, as shown schematically in FIG. 1, and with signal generators as in FIGS. 2 and 3 incorporated therein.
Figure 8:
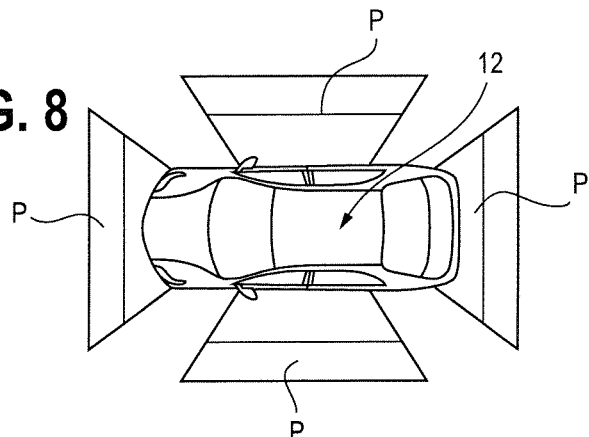
FIG. 8 is a reduced, plan view of the vehicle in FIG. 7 and showing patterns of light generated from the signal generators/generator locations as in FIG. 3.
Figure 9:
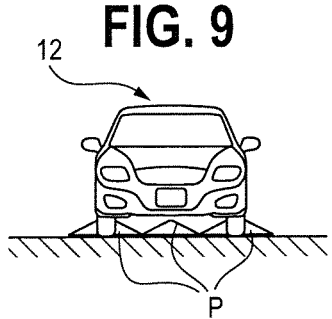
FIG. 9 corresponds to FIG. 8 from a front perspective.
Figure 10:
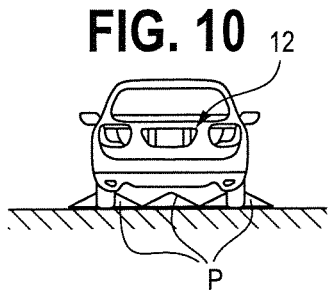
FIG. 10 corresponds to FIG. 8 from a rear perspective.
Figure 11:
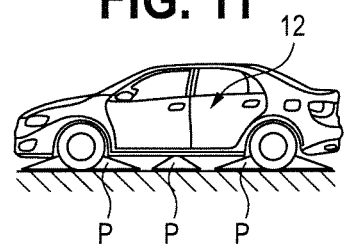
FIG. 11 corresponds to FIG. 8 from a side perspective.
Figure 12:
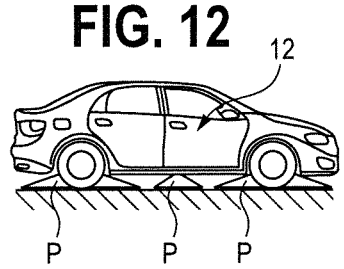
FIG. 12 corresponds to FIG. 8 from a perspective taken from the side opposite that in FIG. 11.

The signal generators 16' at the front 30 and rear 32 of the vehicle 12 may be at any height. In one form, as shown in FIG. 7, the signal generators 16' are located so as to generate sound from the space between the vehicle undercarriage 36 and the underlying ground surface 38.

The sound level generation capability may be dictated by the particular vehicle construction, the mounting location, etc. It is preferred that the generated alarm be at a level of at least 50 decibels and more preferably 90 decibels, and even more preferably at least 120 decibels.

The sound may be in the form of a conventional siren, as used on emergency vehicles, a horn, etc. The sound may be generated continuously or in pulses. The sound level may vary or be produced in other patterns that draw attention to the vehicle 12.

In an alternative form an audible message may be generated to clearly convey that a vehicle has been stolen. For example, a repeating generation of the words "stolen vehicle" at a high decibel level will leave no doubt that the vehicle is under the control of one or more unauthorized persons. Any word or words might be repeated that would clearly notify any person within range of the sound that the vehicle has been hijacked. The projected message may be a single word—"help"—or an alert such as "SOS". Any other form of signal or words is contemplated that would achieve the objective of clearly identifying a vehicle as stolen.

The signal generator 16" may generate light from any location on the vehicle 12. One or any number of such generators 16" may be utilized.

As one representative example, as depicted, four different locations are shown on the vehicle 12 whereat there are separate cooperatively connected signal generators 16". As depicted, the signal generation location is on the vehicle undercarriage 36, but could be anywhere on the vehicle. As depicted, there are separate signal generators/generator locations 16" at the front 30 and rear 32 of the vehicle 12. Separate signal generators/signal generator locations 16" are provided, one each at the opposite vehicle sides 40, 42.

Preferably, the signal from the generators/generator locations 16" is an intense light that disperses in fanning patterns P visible clearly from essentially all vehicle perspectives. While the signal generators/generator locations 16" are shown to generate light from beneath the undercarriage 36, this is not a requirement.

The nature of the light is not critical to the present invention. The light may be pulsed light, continuous light, a strobing light, etc. It is preferred that the intensity of the light is at a level of at least 100 lumens, more preferably at least 4000 lumens, and potentially 7000 lumens or above at each generation location. The light may have different colors. While white light may be preferred for visibility, colored lights, such as on emergency vehicles, may attract more observer attention.

The light patterns may be constant and continuous or may change. For example, light color may change. Light may be generated intermittently from different light generation locations. Light intensity may change.

The invention is also directed to a method of responding to an unauthorized possession of a vehicle configured to transport at least one person. As shown in flow diagram form in FIG. 13, a vehicle is obtained with an associated safety system, as shown at block 44. The safety system is configured to at least one of: a) generate at least one form of detectable signal; b) generate an electronic signal transmittable to a device; and c) generate at least one image of a person in/on the vehicle.

As shown at block 46, an input is generated to cause the system to generate at least one of: i) the at least one form of detectable signal that can be sensed by persons in the vicinity of, or in line of sight of, the motorized vehicle; ii) the electronic signal transmittable to a device; and iii) at least one image of a person in/on the vehicle.

Figure 14:
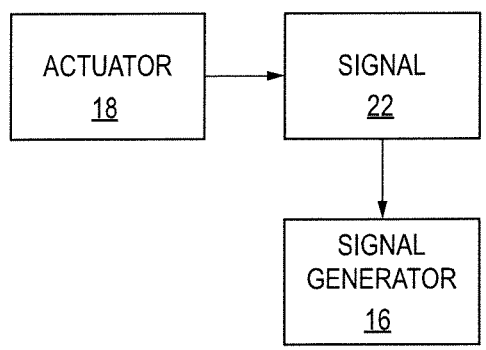
FIG. 14 is a schematic representation of one form of system for effecting transmission of a signal between an actuator and signal generator.

As shown in FIG. 14, the actuation of the signal generator 16 may be effected through the actuator by transmission of a signal 22 that may be through a wired structure or wirelessly. As one example, the actuator 18 may be a component on the vehicle, such as a switch, that the vehicle owner operates upon detecting a dangerous situation.

As but one example, the actuator 18 may be in the form of a switch that is accessible by the driver or an occupant while he/she is within the vehicle compartment. For example, a foot pedal actuator might allow instantaneous or delayed operation of the signal generation(s) 16 with the vehicle occupant sitting in the vehicle or in the process of exiting the vehicle, as under duress. The pedal actuator, or any other actuator, might be discreetly operated without detection by the carjacker.

Actuators 18 may be provided at one or more other locations, such as on a steering wheel, etc.

Still further, an actuator 18 may be provided in the trunk to allow an individual trapped in the closed trunk, as during a kidnapping event, to activate the signal generator(s).

Figure 15:
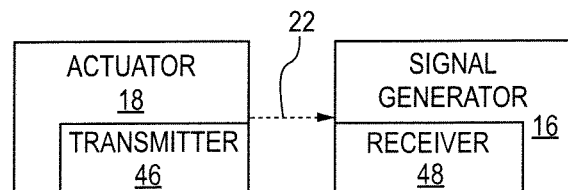
FIG. 15 is a schematic representation of another form of system for effecting transmission of a signal between an actuator and signal generator.

Alternatively, and as shown in more detail in FIG. 15, the actuator 18 has an associated transmitter 46 that wirelessly delivers the signal 22 to a receiver 48 on the signal generator 16, to effect operation thereof. Within the generic showing in FIG. 15 is the intended disclosure of virtually any type of wireless communication system. The signal 22 may be transmitted over the internet, over a local network, over a dedicated network, etc. The system may be a Bluetooth system or any other type of system in existence, or that might be reasonably devised, to accomplish the objectives of either initiating the communication to activating the signal generator 16 and/or to allow transmission of generated signals/data to remote locations. The ability to tie into existing, or developed, apps allows vehicle tracking and/or communication with law enforcement/law enforcement sites, including at call centers.

The system 10 may have an interactive vehicle ID, authentication, and control capability. The system may be incorporated into an RFID equipped vehicle, and may include a transmitting and receiving station, means for controlling operation of the vehicle, means for authenticating the vehicle, and means for controlling the vehicle in a predetermined manner. The system may further include means for updating information associated with the vehicle, and alternatively, or in combination therewith, a personal RFID emitting device to advise the system regarding occupant location.

An open API allows outside technology to code into the system 10. This allows for one- or two-way communication.

Further, with the ability to allow controlled access to the system to authorized entities, established vehicle or industry technology can be used to remotely activate, control, and monitor the system 10.

In still another form, the actuator may be one responsive to an external stimulus, such as the sound of a gunshot, or another loud noise, such as a scream, whereby system operation occurs without manual input on the part of the vehicle owner.

Figure 13:
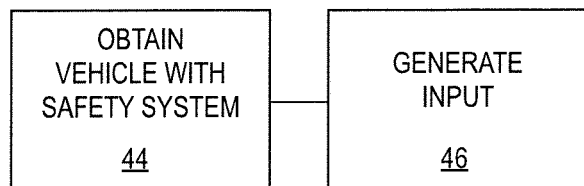
FIG. 13 is a flow diagram representation of a method of responding to an unauthorized possession of a vehicle according to the invention.

Referring back to the method as depicted in FIG. 13, the input may cause at least one form of the signal generator 16 to be operated. Alternatively, multiple forms of the signal generator may be caused to operate. In the event of multiple signal generator forms, the delay feature may be utilized on none, some, or all of the forms.

For example, operation of the signal generator 16 to generate a signal in a form not detectable by persons in the vicinity of the vehicle 12 may occur instantaneously since it would not be detected by the carjacker(s) so as to potentially cause a dangerous reaction. This type of signal may be an electronic signal transmittable to a device locally or at a remote location as described with respect to FIG. 6 so as to potentially alert law enforcement personnel of a carjacking and potentially provide additional vehicle information to facilitate tracking.

Further, the generation of images using the generator 164' in FIG. 5 could be initiated instantaneously since this likewise would be without detection by the perpetrator(s).

Preferably, at least certain of the signal generator forms that will be detectable in the vicinity of the vehicle are time delayed following the generation of the input to the actuator 18.

As noted, the delay feature 20 may be one that is preselected and more preferably is one that can be changed by a user. In one form, a selected time delay is at least fifteen seconds.

More preferably, at least thirty seconds, and even more preferably at least sixty seconds, may allow defusing of a situation before a perpetrator is startled by the detectable signals from the generator 16', 16".

The system 10 may be powered using the associated vehicle power source. In another form, the system 10 is an independent system that may have its own independent power supply and may be set up without integrating into the wiring or electrical system that is part of original manufacturer's equipment or aftermarket additions. The power supply may be one using a rechargeable battery. Recharging can occur independently or through the vehicle's recharging system. Recharging may be accomplished through a system that can harvest energy from sun, wind, vehicle movement etc. The independent nature of the system 10 avoids disabling/blocking thereof by a skilled thief technically aware of conventional vehicle design, both from a mechanical and electronic perspective. Further, an independent closed loop uninterruptable system will not interfere with a vehicle's existing electrical system.

Of course, the system 10 may be integrated into the manufacturer's components—electrical and/or mechanical—whereby some or all of the components of the system 10 may use existing vehicle components. As but one example, the vehicle's original wiring may be used to integrate the system 10. The system 10 may use, in addition to its own system generator(s), signal generators that are original equipment or aftermarket add-ons. For example, a vehicle's headlights, running lights, brake lights, etc. might be triggered with activation of the system 10. Similarly, a horn or siren originally on, or added to, the vehicle might be activated with the system 10 to realize a cumulative effect.

Further, the system 10 may be scalable to be integrated into a vehicle's anti-theft or overall software and/or hardware system. The system 10 is scalable to allow for a future proof technology. The system 10 may be capable of operating on an open interface in a vehicle's existing car theft deterrent system and/or the manufacturer's or an aftermarket subscription-based service.

The system 10 may also be designed to not only alert those within the vicinity of the vehicle to the theft but may also utilize one or more signal generators 16', that may be located in or adjacent the passenger compartment that is so intolerable to a thief within the vehicle compartment that he/she may abort the carjacking effort.

The system 10 may be designed so that it cannot be deactivated for a minimum of a first predetermined time, such as on the order of ten minutes, potentially programmable up to one or two hours, or more, of constant notification/signal generation.

The system 10 is designed so that its overall operation can be pre-programmed by the vehicle owner/operator. Once programmed, all settings can be maintained until changed by an authorized person. Thus, once activated, a thief, particularly with a fully independent system 10, will be unable to interrupt, alter, or deactivate the programmed operation thereof.

In a still further alternative form, one or more of the generators 16 may be activated by a motion sensor switch whereby the theft of an unattended car may trigger any or all of the signals noted.

Remote actuation of the generator 16 by the vehicle owner, as through a wireless transmitter, may also allow protection of an unoccupied vehicle or allow the vehicle owner, once ordered from the vehicle, to operate the system 10 from a safe distance.

The system 10 is preferably programmable for different functions/operations and scalable. The system 10 may incorporate the ability to remotely activate and update feature capabilities. A purchaser/user of the system 10 may select features as desired, including any one or more of the herein described capabilities.

In brief, the present invention may preferably include the following technical and operational aspects:
(1) a working range is 5 to 10 feet;
(2) a programmable memory map;
(3) in one particularly preferred embodiment, ten allocated memory addresses are assigned to allow multiple members of a family or company to operate the same vehicle properly and safely.
(4) a designated address being reserved for shut down mode using VIN code or a universal code.
(5) a multiple address group for high value cargo such as, for example, infants, children, or high price instruments; and
(6) A local time delayed system within the vehicle that allows the owner of the vehicle to activate.
(7) Once the owner of the vehicle is engaged in a threatening situation, the owner can activate the time delayed system while exiting the vehicle.
(8) Once activated, the occupant of the vehicle is to exit the vehicle immediately to allow for a no confrontational engagement with the assailant. No possession or material item is worth the life of you or your loved ones.
(9) Within 60 seconds (optional time settings are available) the vehicles AVD (Audio Visual Deterrent) system will enter audio annunciation mode. The audio annunciation mode will activate and alarm of 120 dba (decibels). Fire alarms are set at a maximum level of 120 dBA; however even at this high level, an individual's true exposure is unlikely to approach the 90 dBA average due to: Distance away from the alarm—noise levels fall off as the square of the distance. This system activates sirens located in the front, rear and interior of the vehicle. The location of these sirens allows for notification of the vehicle heading towards and leaving areas of population. The interior siren creates an ear-piercing sound within the vehicle that will act as a deterrent for the thief to continue, forcing abandonment of the theft.

(10) The activation of the AVD simultaneously activate the visual annunciation mode. The visual annunciation mode will activate (4) 7,00o+ lumen strobing light beacons strategically placed in the front, rear and sides of the undercarriage of the vehicle. Allowing for notification in sequence with the audio system to bring notification to the vehicle that the occupant is illegally in possession of the vehicle. This will allow for local and CCTV traffic cameras to visually identify the assailants route for immediate retrieval of the vehicle and potentially the victims that may still be in the vehicle.

(11) The AVD system will activate an interior camera that will record the assailant of the vehicle that can be used in news and various social media platforms to help identify the car jacker. The interior device can wirelessly send out real time visual of the assailant.

More specifically, the present invention is also directed to an interactive vehicle ID, authentication, and control system. This system includes an RFID equipped vehicle, a transmitting and receiving station, means for controlling operation of the vehicle, means for authenticating the vehicle, and means for controlling the vehicle in a pre-determined manner. The system may further include means for updating information associated with the vehicle, and alternatively, or in combination therewith, a personal RFID emitting device to advise the system regarding occupant location.

The foregoing disclosure of specific embodiments is intended to be illustrative of the broad concepts comprehended by the invention.

What is claimed is:

1. A method of responding to an unauthorized possession of a vehicle configured to be operated by and to transport at least one person, the method comprising the steps of:
    obtaining the vehicle with an associated safety system wherein the safety system includes an actuator, a signal generator, and a tracking system, the safety system is configured to respond to the unauthorized possession of the vehicle by an unauthorized user;
    triggering the actuator conditioned upon the unauthorized possession of the vehicle by an unauthorized user during a carjacking event whereupon the actuator generates an input configured to be sent to the signal generator;
    receiving the input from the actuator by the signal generator whereupon the signal generator activates a safety system configured to activate a delayed signal generator to delay a signal until a delayed signal is detected;
    generating a delay mechanism upon activation of the delayed signal generator configured to delay the activation of the delayed signal for a predetermined fixed period of time greater than thirty seconds after the activation of the delay signal generator prior to sending the delayed signal to the signal generator;
    generating a signal from the signal generator after the predetermined fixed period of time after the delay feature is activated and after receiving the delayed signal;
    activating the safety system upon receiving the signal wherein the safety system is configured to: a) generate at least one form of detectable signal recognizable by a person in the vicinity of the vehicle; b) generate an electronic signal; and c) generate at least one image of a person in/on the vehicle;
    generating an activation signal in the signal generator upon receiving the signal to cause the system to generate: i) the at least one form of detectable signal that can be sensed by persons in the vicinity of the vehicle; ii) the electronic signal transmittable to a device; and iii) the at least one image of a person in/on the vehicle, the system configured so that at least one of the at least one form of detectable signal, the electronic signal, and the at least one image is generated after a time delay following the generation of the input; and
    actuating a tracking alarm electrically connected to the safety system configured to receive the activation signal whereupon receiving the activation signal the tracking alarm generates an electronic tracking signal detectable by a tracking system.

2. The method of responding to an unauthorized possession of a vehicle according to claim 1 wherein the at least one form of detectable signal is aurally detectable.

3. The method of responding to an unauthorized possession of a vehicle according to claim 1 wherein the at least one form of detectable signal is visually detectable.

4. The method of responding to an unauthorized possession of a vehicle according to claim 2 wherein the safety system is configured so that the aurally detectable signal is generated from spaced locations.

5. The method of responding to an unauthorized possession of a vehicle according to claim 3 wherein the safety system is configured so that the visually detectable signal is generated from spaced locations.

6. The method of responding to an unauthorized possession of a vehicle according to claim 5 wherein the step of generating a signal comprises generating an input through a wireless transmitter.

7. The method of responding to an unauthorized possession of a vehicle according to claim 1 wherein the at least one image is generated upon the input being generated.

8. The method of responding to an unauthorized possession of a vehicle according to claim 1 wherein the at least one image is generated after the time delay following the generation of the input to the safety system.

9. The method of responding to an unauthorized possession of a vehicle according to claim 1 wherein the generation of the at least one image comprises a generation of streamed images.

10. The method of responding to an unauthorized possession of a vehicle according to claim 1 further comprising the step of causing the at least one image to be transmitted to a prescribed location.

11. The method of responding to an unauthorized possession of a vehicle according to claim 2 wherein the vehicle has a passenger compartment and the aurally detectable signal is generated from within the passenger compartment.

12. The method of responding to an unauthorized possession of a vehicle according to claim 4 wherein the spaced location comprises a first location adjacent to a front of the vehicle and a second location adjacent to a rear of the vehicle.

13. The method of responding to an unauthorized possession of a vehicle according to claim 5 wherein the spaced location comprises at least three locations.

14. The method of responding to an unauthorized possession of a vehicle according to claim 5 wherein the spaced location comprises a first location adjacent to a front of the vehicle, a second location adjacent a rear of the vehicle, and third and fourth locations, one each adjacent spaces sides of the vehicle.

15. The method of responding to an unauthorized possession of a vehicle according to claim 5 wherein the vehicle has an undercarriage and spaced locations are on the undercarriage.

16. The method of responding to an unauthorized possession of a vehicle according to claim 2 wherein the aurally detectable signal is generated at a level of at least 50 decibels.

17. The method of responding to an unauthorized possession of a vehicle according to claim 3 wherein the visually detectable signal is generated at a level of at least 4000 lumens.

18. The method of responding to an unauthorized possession of a vehicle according to claim 3 wherein the visually detectable signal is a strobing light.

19. The method of responding to an unauthorized possession of a vehicle according to claim 1 wherein the predetermined fixed time interval is at least 60 seconds.

* * * * *